United States Patent
Ramani et al.

(10) Patent No.: US 7,357,908 B2
(45) Date of Patent: *Apr. 15, 2008

(54) APPARATUS AND CATALYTIC PARTIAL OXIDATION PROCESS FOR RECOVERING SULFUR FROM AN $H_2S$-CONTAINING GAS STREAM

(75) Inventors: Sriram Ramani, Ponca City, OK (US); Alfred E. Keller, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/063,145

(22) Filed: Feb. 22, 2005

(65) Prior Publication Data

US 2005/0201924 A1 Sep. 15, 2005

Related U.S. Application Data

(63) Continuation-in-part of application No. 10/024,679, filed on Dec. 18, 2001, now Pat. No. 6,946,111.

(60) Provisional application No. 60/256,440, filed on Dec. 18, 2000.

(51) Int. Cl.
*C01B 17/04* (2006.01)
(52) U.S. Cl. .................. 423/574.1; 423/576.8
(58) Field of Classification Search ............. 423/574.1, 423/576.8
See application file for complete search history.

(56) References Cited

U.S. PATENT DOCUMENTS

| | | |
|---|---|---|
| 1,930,716 A | 10/1933 | Jaegar |
| 2,963,348 A | 12/1960 | Sekkers |
| 3,752,877 A | 8/1973 | Beavon |
| 4,038,036 A | 7/1977 | Beavon |
| 4,146,580 A | 3/1979 | Beavon |
| 4,197,277 A | 4/1980 | Sugier et al. |
| 4,219,445 A | 8/1980 | Finch |
| 4,233,276 A | 11/1980 | D'Souza et al. |
| 4,271,041 A | 6/1981 | Boudart |
| 4,279,882 A | 7/1981 | Beavon |

(Continued)

FOREIGN PATENT DOCUMENTS

EP 0 303 438 8/1988

(Continued)

OTHER PUBLICATIONS

Chao, J., *Properties of Elemental Sulfur*, Hydrocarbon Processing, 217-223, (1980).

(Continued)

*Primary Examiner*—Wayne A. Langel
(74) *Attorney, Agent, or Firm*—Conley Rose P.C.

(57) ABSTRACT

The disclosed sulfur recovery system and process avoid some of the operational problems of conventional Claus plants and processes by replacing the reaction burner and furnace tube of a conventional Claus plant with a more efficient short contact time catalytic reactor assembly containing a SPOC™ catalyst that operates efficiently at elevated temperatures. Such Claus plant modification also reduces or avoids the negative effects of hydrocarbons, $CO_2$ and ammonia in Claus sulfur plant feeds, and permits efficient processing of dilute to concentrated $H_2S$ feeds. The disclosed modification makes possible the expansion of Claus plant capacity at lower cost.

11 Claims, 2 Drawing Sheets

U.S. PATENT DOCUMENTS

| | | | |
|---|---|---|---|
| 4,302,434 A | 11/1981 | Hellmer et al. | |
| 4,311,683 A | 1/1982 | Hass et al. | |
| 4,325,842 A | 4/1982 | Slaugh | |
| 4,325,843 A | 4/1982 | Slaugh | |
| 4,326,992 A | 4/1982 | Slaugh | |
| 4,331,544 A | 5/1982 | Takaya | |
| 4,406,873 A | 9/1983 | Beavon | |
| 4,481,181 A * | 11/1984 | Norman | 423/576.8 |
| 4,632,043 A | 12/1986 | Pendergraft | |
| 4,632,818 A * | 12/1986 | Chen et al. | 423/574.1 |
| 4,684,514 A | 8/1987 | Chen | |
| 4,722,799 A | 2/1988 | Ashbrook et al. | |
| 4,797,268 A | 1/1989 | McGovern et al. | |
| 4,814,159 A | 3/1989 | Voirin | |
| 4,844,837 A | 7/1989 | Heck et al. | |
| 4,863,707 A | 9/1989 | McShea, III et al. | |
| 4,877,550 A | 10/1989 | Goetsch et al. | |
| 4,886,649 A | 12/1989 | Ismagilov et al. | |
| 4,889,701 A | 12/1989 | Jones et al. | |
| 4,891,187 A | 1/1990 | Jungfer et al. | |
| 4,988,494 A | 1/1991 | Lagas et al. | |
| 5,039,503 A | 8/1991 | Sauvion et al. | |
| 5,185,140 A | 2/1993 | Kvasnikoff et al. | |
| 5,232,467 A | 8/1993 | Child et al. | |
| 5,338,716 A | 8/1994 | Triplett | |
| 5,451,557 A | 9/1995 | Sherif | |
| 5,458,808 A | 10/1995 | Suggitt et al. | |
| 5,472,920 A | 12/1995 | Dubois et al. | |
| 5,508,013 A | 4/1996 | Kvasnikoff et al. | |
| 5,512,260 A | 4/1996 | Kiliany et al. | |
| 5,573,991 A | 11/1996 | Sherif | |
| 5,597,546 A | 1/1997 | Li et al. | |
| 5,603,913 A | 2/1997 | Alkhazov | |
| 5,628,977 A | 5/1997 | Heisel et al. | |
| 5,639,929 A | 6/1997 | Bharadwaj et al. | |
| 5,648,582 A | 7/1997 | Schmidt | |
| 5,653,953 A | 8/1997 | Li et al. | |
| 5,654,491 A | 8/1997 | Goetsch | |
| 5,676,921 A | 10/1997 | Heisel et al. | |
| 5,700,440 A | 12/1997 | Li | |
| 5,720,901 A | 2/1998 | De Jong et al. | |
| 5,807,410 A | 9/1998 | Borsboom | |
| 5,814,293 A | 9/1998 | Terorde et al. | |
| 5,891,415 A | 4/1999 | Alkhazov et al. | |
| 5,897,850 A * | 4/1999 | Borsboom et al. | 423/576.2 |
| 5,965,100 A | 10/1999 | Khanmamedov | |
| 5,985,178 A | 11/1999 | Long et al. | |
| 6,017,507 A * | 1/2000 | Nougayrede et al. | 423/573.1 |
| 6,083,471 A | 7/2000 | Philippe et al. | |
| 6,099,819 A | 8/2000 | Srinivas et al. | |
| 6,103,206 A | 8/2000 | Taylor, Jr. et al. | |
| 6,103,773 A | 8/2000 | Wittenbrink et al. | |
| 6,221,280 B1 | 4/2001 | Anumakonda et al. | |
| 6,235,259 B1 | 5/2001 | Ledoux et al. | |
| 6,372,193 B1 | 4/2002 | Ledoux et al. | |
| 6,402,989 B1 | 6/2002 | Gaffney | |
| 6,403,051 B1 | 6/2002 | Keller | |
| 6,409,940 B1 | 6/2002 | Gaffney et al. | |
| 6,447,745 B1 | 9/2002 | Feeley et al. | |
| 6,488,838 B1 * | 12/2002 | Tonkovich et al. | 208/108 |
| 6,497,812 B1 | 12/2002 | Schinski | |
| 6,540,975 B2 | 4/2003 | Tonkovich et al. | |
| 6,579,510 B2 | 6/2003 | Keller et al. | |
| 6,616,909 B1 | 9/2003 | Tonkovich et al. | |
| 6,800,269 B2 | 10/2004 | Keller | |
| 6,946,111 B2 * | 9/2005 | Keller et al. | 423/576.2 |
| 7,138,101 B2 * | 11/2006 | Keller et al. | 423/573.1 |

FOREIGN PATENT DOCUMENTS

| | | |
|---|---|---|
| FR | 2702675 | 3/1993 |
| RU | 2023655 | 11/1994 |
| WO | WO 97/19019 | 5/1997 |
| WO | WO 01/81241 | 11/2001 |

OTHER PUBLICATIONS

Chun, Sung Woo et al, *Selective oxidation of H2S to elemental sulfur over TiO$_2$/SiO$_2$ catalysts*, Applied Catalysis B: Environmental 16, 235-243 (1998), (no month).

Claridge, et al, *New Catalysts for the Conversion of Methane to Synthesis Gas: Molybdenum and tungsten Carbide*, J. Catalysis 180, 85-100 (1998), (no month).

Cybulski, A., and Moulijin, J.A., *Transformation of a Structured Carrier into Structured Catalyst*, Structured Catalysts and Reactors, Marcel Dekker, pp. 599-615, 1998, (no month).

Gamson, B.W. et al., *Sulfur from Hydrogen Sulfide*, Chem Eng. Prog. vol. 49, No. 4, pp. 203-215, Apr. 1953.

Goar, B. Gene, *Today's Sulfur Recovery Processes*, Hydrocarbon Processing vol. 47, No. 9, 248-252 (1968), (no month).

Goar, R. Gene, *First Recycle Selectox unit on stream*, Oil & Gas Journal, 124-125 (1982), (no month).

Haaland, David M., *Noncatalytic Electrodes for Solid-Electrolyte Oxygen Sensors*, J. Electrochem. Soc.: Electrochemical Science and Technology, vol. 127, No. 4, 796-804 (1980), (no month).

Hass, R.H. et al, *Process meets sulfur recovery needs*, Hydrocarbon Processing 104-107 (1981), (no month).

Hickman, D.A. et al., *Synthesis Gas Formation by Direct Oxidation of Methane over Pt Monoliths*, J. Catalysis 138, pp. 267-282 (1992), (no month).

Hyne, J. B., *Methods for desulfurization of effluent gas streams*, The Oil & Gas Journal, 64-78 (Aug. 28, 1972).

Ismagilov, Z.R. et al, *New Catalysts and Processes For Environment Protection*, React. Kinet. Catal. Lett., vol. 55, No. 2, 489-499 (1995), (no month).

Kerr, Richard K. et al, *A new sulfur-recovery process: The RSRP*, Oil & Gas Journal 230-243 (1982), (no month).

Kohl, Arthur L. and Riesenfeld, Fred C., *Gas Purification, Fourth Edition*, Gulf Publishing Company, Library of Congress Cataloging in Publication Data, TP7545K6, 1885, 665.7, 85-4148, ISBN 0-87201-314-6, pp. 457-460, (no month).

Lagas, J.A. et al, *Selective-oxidation catalyst improves Claus process*, Oil & Gas Journal, 68-71 (1988), (no month).

Li, Kuo-Tseng and Shyu, Ni-Shen, *Catalytic Oxidation of Hydrogen Sulfide to Sulfur on Vanadium Antimonate*, Ind. Eng. Chem. Res. 1480-1484 (1997), (no month).

Mellor, J.W., *A Comprehensive Treatise on Inorganic and Theoretical Chemistry*, vol. X, Longmans, Green and Co., New York, 118-119, 128-129, 206-213,221-223,144-148,152-159,162-166,393-400 (1947), (no month).

M.E.D. Raymont, *Role of hydrogen in Claus plants*, Hydrocarbon Processing, 177-179 (1975), (no month).

M.E.D. Raymont, *Make hydrogen from hydrogen sulfide*, Hydrocarbon Processing, 139-142 (1975).

Taylor, H. Austin and Pickett, Charles F., *The Decomposition of Hydrogen Sulphide*, Journal of Physical Chemistry, vol. 31, pp. 1212-1219 (1927), (no month).

S. C. Tsang et al., *Recent advances in the conversion of methane to synthesis gas*, Catalysis Today 23:3-15 (1995), (no month).

Watson, R.W. et al., *The Successful Use of Oxygen in Claus Plants*, HTI Quarterly: Winter 1995/1996, pp. 95-101.

PCT Search Report in PCT/US01/48795 dated Jun. 26, 2002 (4 pp.).

Hickman, D.A., et al. "Production of Syngas by Direct Catalytic Oxidation of Methane," Science 259:343-346 (Jan. 15, 1993).

International Preliminary Report on Patentability on International application PCT/US2006/06255 dated Aug. 27, 2007 (4 pg.).

Search Report & Written Opinion on International application PCT/US2006/06255 dated Sep. 14, 2006 (4 pg.).

* cited by examiner

APPARATUS AND CATALYTIC PARTIAL OXIDATION PROCESS FOR RECOVERING SULFUR FROM AN H₂S-CONTAINING GAS STREAM

CROSS-REFERENCE TO RELATED APPLICATIONS

This application is a continuation-in-part of U.S. patent application Ser. No. 10/024,679 filed Dec. 18, 2001, now U.S. Pat. No. 6,946,111, which claims the benefit under 35 U.S.C. § 119(e) of U.S. Provisional Patent Application No. 60/256,440 filed Dec. 18, 2000. The disclosure of each said application is hereby incorporated herein by reference.

BACKGROUND OF THE INVENTION

1. Technical Field of the Invention

The present invention generally relates to Claus sulfur recovery plants and to processes for recovering sulfur from H₂S-containing gas streams. More particularly, the invention relates to a Claus process and apparatus in which the combustion stage is replaced by a catalytic partial oxidation stage in which elemental sulfur and sulfur dioxide is produced.

2. Description of the Related Art

Sulfur-recovery plants, also called Claus plants, are well known for removing hydrogen sulfide gas (H₂S) resulting from petroleum refining processes and other industrial processes by converting the H₂S to elemental sulfur. A conventional modified Claus process includes two primary stages: a thermal or combustion stage and a catalytic or "Claus" stage. In the thermal stage, which is carried out in a furnace, the H₂S gas is contacted with a stoichiometric amount of air or a mixture of oxygen and air in a flame so that about one third (⅓) of the H₂S is combusted according to the reaction:

$$H_2S + 3/2 O_2 \rightarrow SO_2 + H_2O \qquad (1)$$

Reaction 1 is highly exothermic and not limited by equilibrium. Still in the reaction furnace, a portion of the uncombusted H₂S (i.e., about ⅔ of the initial amount in the feed) reacts with some of the sulfur dioxide (SO₂) product to form elemental sulfur (S⁰) and water vapor according to the reaction:

$$H_2S + \tfrac{1}{2}SO_2 \leftrightharpoons 3/x S^0_x + 2H_2O \qquad (2)$$

(x=2, 6, or 8 depending on the temperature and pressure.) Chemical Reaction 2, which is sometimes referred to as the "Claus reaction," is endothermic, and the extent of conversion of the H₂S and SO₂ to elemental sulfur is limited by the chemical equilibrium of the reaction. In the thermal stage a total of about 55 to 70% of the H₂S in the original feed is converted to elemental sulfur. To improve the yield, the reacted gases are cooled in a fire tube boiler after emerging from the reaction furnace and elemental sulfur is condensed from the gas stream and removed in molten form, whereupon the gases enter a catalytic stage, which is carried out in a series of catalytic reactors.

In the catalytic stage, the gases are reheated and then passed over a catalyst bed that promotes the Claus reaction and further converts the process stream to elemental sulfur according to the Claus reaction. Because of the reversible chemical equilibrium of the Claus reaction (Reaction 2), the formed products can react according to the reverse Claus reaction

$$3/x S^0_x + 2H_2O \leftrightharpoons H_2S + \tfrac{1}{2}SO_2 \qquad (3)$$

with the effect of reducing the efficiency of the Claus plant. The reverse Claus reaction becomes more pronounced as reactor temperature increases. By removing formed elemental sulfur from the process gas exiting the thermal stage, the forward Claus reaction is made more favorable. Following the thermal stage, in the catalytic stage the sulfur depleted gases are reheated, catalytically reacted, and again cooled to condense and separate an additional increment of sulfur. In the catalytic stage, the remaining H₂S is reacted with the SO₂ (at lower temperatures, i.e., about 200-350° C.) over a catalyst to make more sulfur. The catalyst promotes the Claus reaction (Reaction 2), however even the best catalysts cannot cause the Claus reaction to go to completion. For this reason, additional catalytic reactors are necessary to remove sequential increments of sulfur. Factors like concentration, flow rate and reaction temperature influence the reaction. From one to four sequential stages of reheating, catalytic reacting and condensing are usually employed industrially. In a typical modified Claus plant in which two or three catalytic reactors are employed, about 90 to 98% of the H₂S originally fed to the plant is recovered as elemental sulfur. Any remaining H₂S, SO₂, sulfur, or other sulfur compounds in the Claus plant effluent are usually either incinerated to SO₂ and discharged to the atmosphere, or incinerated to SO₂ and absorbed by chemical reaction, or converted by hydrogen to H₂S and recycled or absorbed using any of a variety of well known Claus tail gas treatment units which improve the efficiency of sulfur removal from the gas discharged to the atmosphere. One example is the well-known SCOT™ process for cleaning up the tail gas from the process. Other common treatments involve absorption of sulfur-containing compounds in the tail gas by an alkanolamine solution.

A conventional modified Claus process can be used efficiently for processing large quantities of gases containing a high concentration (i.e., >40 vol. %) H₂S in Claus plants producing more than 7,000 tons of sulfur per year. The modified Claus plants in use today are normally operated at less than 2 atmospheres pressure. Because of this low pressure, the pipes and vessels have very large diameters for the flow compared to most refinery or gas plant processes. The low pressure operation forces the equipment to be designed for low pressure drop to have adequate capacity. Therefore, a typical modified Claus plant, together with one or more tail gas treatment units, is large and the plant includes a great deal of equipment. Over the years, various changes to the modified Claus process and apparatus have been suggested, many of which are directed primarily toward improving or replacing the thermal reactor.

For example, U.S. Pat. No. 4,279,882 (Beavon) discusses eliminating the thermal reactor, including the combustion chamber and heat exchanger, and instead producing sulfur by contacting with a catalyst a feed gas comprising an acid gas stream containing from about 1-100% (by volume) H₂S in admixture with about 70-130% of the stoichiometric amount of oxygen required for conversion of hydrogen sulfide to sulfur, and a recycle gas, to form a gas stream comprising hydrogen sulfide, sulfur dioxide and sulfur at a temperature between the kindling temperature of the catalyst and about 850° F. The catalyst is selectively capable of oxidizing hydrogen sulfide to sulfur dioxide substantially without formation of sulfur trioxide. The recycle gas is a portion of the gas resulting from condensing sulfur from the effluent of the catalytic selective oxidation zone. Catalysts such as vanadium oxide and vanadium sulfide on a non-alkaline porous support are described.

Even though modified Claus processes are efficient and proven processes for many applications in commercial use today, that technology has certain inherent limitations that erode its usefulness in many industrial situations. Some of the major drawbacks of existing Claus technology arise from a) the inability to process $H_2S$ streams containing less than about 20% $H_2S$, b) hydrocarbon contamination of the feed gas, c) excessive carbon dioxide ($CO_2$) in the feed gas, d) ammonia in the feed gas, e) insufficient residence time in the burner/reaction chamber, and f) excessive pressure drop caused by flow friction.

Insufficient $H_2S$ concentration in the feed. One problem with conventional Claus plants used in industry today is the inability to efficiently handle feed gas streams in which the $H_2S$ content is 20% or less. Although Reaction 1 is highly exothermic, if there is too little $H_2S$ in the feed stream, the heat of reaction will be insufficient to perpetuate the reaction without the addition of heat from another source. Typically the Claus feed must contain more than about 20% $H_2S$ (by volume) in order to support a flame in the Claus burner. Thus, sour gas streams containing less than about 20% $H_2S$ cannot be satisfactorily desulfurized in a conventional Claus or modified Claus process. The difficulty of maintaining a workable flame temperature in the Claus burner is also discussed in U.S. Pat. No. 4,279,882 (Beavon). In practice, the flame temperature is often sustained by adding hydrocarbon gas as a fuel. This, however, significantly complicates control of the process, creates the danger of forming tarry products and discolored sulfur, and reduces the recovery of sulfur by forming water, a reaction product which is adverse to the Claus equilibrium. It also amplifies the problem of forming carbonyl sulfide and carbon disulfide, which are difficult to convert on a continuous basis in the Claus plant.

Hydrocarbon contamination of the feed. The presence of hydrocarbons in the $H_2S$ feed to a Claus plant may also result from releasing dissolved light alkanes from alkanolamine or other gas treating solutions into the Claus feed gas stream. This can occur as a result of a conventional solvent regeneration process, releasing methanol or aromatic hydrocarbons such as benzene along with $H_2S$. Hydrocarbons in the Claus feed can burn before the $H_2S$ reaction to $SO_2$ takes place, thereby starving the reaction (Reaction 1) of air and reducing its efficiency. The same volume of methane as $H_2S$ in the feed requires four times as much air for complete combustion as does the oxidation of $H_2S$ to sulfur, and the combustion of methane also releases more heat in the process. This can temporarily deprive the $H_2S$ oxidation reaction of the necessary oxygen, and thus reduces the production of $SO_2$ and ultimately reduces the sulfur recovery efficiency of the unit. Another drawback of the presence of hydrocarbons in the Claus feed is that the hydrocarbons can form soot, a mixture of unburned hydrocarbon and solid carbon, when the hydrocarbon is burned in a reducing environment. Soot can deposit on the catalyst in the latter stages of the Claus process, causing loss of catalyst activity and catalyst bed plugging.

Hydrocarbons in the Claus feed can also react with $H_2S$ to form COS and $CS_2$. Not only does this further reduce sulfur recovery efficiency, if those compounds emerge unconverted from the Claus plant, they are likely to end up as sulfur dioxide emissions after incineration of the Claus plant tail gas. This can be very important in many locations throughout the world where sulfur dioxide emissions are closely regulated. Completely combusting the hydrocarbon feed components in the Claus reaction furnace will also produce a large volume of combustion gases, in addition to consuming a greater amount of air to support the combustion than would otherwise be required to support the combustion of the $H_2S$ component. The combination of more hydrocarbon combustion products, with the added nitrogen from air, when air is used as the source of oxygen, leads to the further problem of excessive flow friction.

Excessive carbon dioxide in the feed. In many gas treating applications, $H_2S$ is usually removed by solvents, with subsequent regeneration and recycle of the solvent. Usual solvents include aqueous solutions of alkanol amines, such as monoethanolamine (MEA), diethanolamine (DEA), diisopropylamine (DIPA), and methyldiethanolamine (MDEA). The $H_2S$-containing gaseous stream is contacted with the amine solution at relatively low temperatures in an absorber to remove the $H_2S$. This step produces a rich amine stream, loaded with $H_2S$. This rich amine is then passed to a stripper/regenerator, usually a tray type column where the solvent is heated to release the $H_2S$, leaving a lean amine stream that can be recycled as fresh solvent to the absorber. Oftentimes $CO_2$ is present in significant amounts along with the $H_2S$. In natural gas, for example, typically the $CO_2$ is absorbed by the solvent concurrently with the $H_2S$. Because the $CO_2$ is released along with the $H_2S$ in the treating solvent regeneration step, it becomes part of the Claus plant feed along with $H_2S$. As the concentration of carbon dioxide increases in the feed, the heat release per unit volume of feed gas drops, which may make an $H_2S$ flame impossible, thus rendering the burner of the Claus plant inoperative. As described in U.S. Pat. No. 6,506,349 (Khanmamedov), one way to address this problem is to use a solvent that is selective for $H_2S$ in the presence of $CO_2$. Another way that some processors have compensated for the $CO_2$-related heat drop is by supplementing the feed with hydrocarbon in order to increase the flame temperature by combustion of hydrocarbon. As discussed above, this solution to the carbon dioxide problem then exacerbates the problems associated with hydrocarbon contamination of the Claus feed.

Ammonia in the feed. The presence of ammonia in Claus plant feed gases is common in the oil refining industry. For instance, ammonia results from denitrification of oils simultaneously with desulfurization that forms $H_2S$. When ammonia is present in the Claus feed, it reacts in the flame/reaction furnace in a step-wise manner according to the reaction:

$$H_2S+3/2O_2 \rightarrow SO_2+H_2O \tag{4}$$

followed by the reaction:

$$6SO_2+8NH_3 \rightarrow 3S_2+4N_2+12H_2O \tag{5}$$

This requires oxygen from air to combust the $H_2S$ first, then adequate time for the ammonia and $SO_2$ to react, usually about 1 second for a typical Claus reaction furnace. The size of the reaction tube and the temperature inside the reaction tube are important factors in determining whether the ammonia conversion is taken to completion (Reaction 5). Ammonia that is not converted in the thermal stage can deposit in the back end of the plant in the form of ammonium sulfate or as various sulfate salts, or can pass through to the incinerator and be emitted as ammonia salts which can create an undesirable visible plume from the incinerator stack. U.S. Pat. No. 3,987,154 (Lagas) describes one process for removal of hydrogen sulfide and ammonia from a gaseous stream which endeavors to avoid clogging of the system as a result of ammonia combining with acidic compounds like $H_2S$, $SO_2$, $SO_3$ and nitrogen oxides forming salts that may deposit as solids.

Insufficient residence time in the reaction furnace. In a typical modified Claus plant, the reacted gas mixture leaving the reaction furnace goes immediately to a waste heat exchanger to cool the reaction gases to prepare the mixture for sulfur condensation. Over their operational lifetimes, Claus plants have had to operate at ever increasing capacity in order to accommodate increased loads. Thus, the amount of time each portion of reaction mixture leaving the burner spends at high temperature in the reaction furnace has decreased as a result. By shifting the reacted gases to lower temperatures more quickly, the Claus equilibrium conversion curve (of Reaction 2) is pushed toward lower levels of conversion. Because of the increased load on the catalyst beds, this can also lead to higher emissions of unconverted compounds such a COS and $CS_2$. Insufficient gas residence time may also prevent complete ammonia conversion to nitrogen and water products (Reaction 5) and lead to unit plugging or incinerator plumes.

Excessive pressure drop. The primary factor that determines the capacity limits of a Claus unit is the pressure drop that is available to accommodate the flow through the plant and the pressure drop needed to operate the instruments and control valves. As capacity demand increases, the pressure drop due to control losses and friction due to flow increase eventually allows for no more flow through the unit.

Another notable problem with conventional Claus plants is that not only are tail gas treatment units quickly overwhelmed when employed in a high capacity Claus plant with greater than few % $H_2S$ concentration in the tail gas, but the added expense of tail gas treatment is prohibitive for commercial industrial applications. U.S. Pat. No. 5,700,440; U.S. Pat. No. 5,807,410 and U.S. Pat. No. 5,897,850 describe some of the limitations of existing tail gas treatment (TGT) processes and the difficulty of meeting increasingly stringent government requirements for desulfurization efficiency in the industry. In what are generally considered the most efficient Claus tail gas treatment processes for removing $H_2S$, a catalyst that is capable of promoting the direct oxidation of $H_2S$ according to the reaction $$H_2S + \tfrac{1}{2}O_2 \rightarrow \tfrac{1}{2}S_2 + H_2O \tag{6}$$

to produce elemental sulfur and water is employed at low temperature (i.e., above the dewpoint of sulfur but below about 350° C., typically less than 245° C.). As explained in U.S. Patent Application Publication No. 2001/0008619 (Geus et al.), a drawback of many direct oxidation catalysts used for selective oxidation of sulfur compounds is that upon substantially complete conversion of $H_2S$ to elemental sulfur, the oxidation of the produced sulfur to $SO_2$ increases with increasing temperature. Conventional direct oxidation catalysts operate at temperatures below 500° C., typically staying between the dewpoint of sulfur and 350° C. Because Reaction 6 is not a thermodynamically reversible reaction, direct oxidation techniques offer potentially higher levels of conversion than is typically obtainable with the thermal and catalytic stages of a modified Claus process.

Most direct oxidation methods are only applicable to sour gas streams containing relatively small amounts of $H_2S$ and large amounts of hydrocarbons. For instance, U.S. Pat. No. 4,311,683 (Hass et al.) describes a process for removal of hydrogen sulfide from gas streams employing a catalyst that is selective for the oxidation of $H_2S$ at low temperatures (121-232° C.). In that process, such highly oxidizable components as $H_2$, CO and light hydrocarbons, which all might be present in the $H_2S$ stream, remain essentially completely unoxidized. Such processes are generally not particularly well suited for handling the more concentrated acid gas streams from refineries, however. For this reason direct oxidation methods have been generally limited to use as tail gas treatments only, and have not found general industrial applicability for first stage sulfur removal systems from gases containing large quantities of $H_2S$. The restriction to low $H_2S$ concentration gases is due, in part, to the increase in adiabatic heating of the catalyst bed that occurs at higher concentrations of $H_2S$, i.e., above about 3 vol % $H_2S$ in the feed. The limit of heat tolerance of the reaction vessel, which is typically made of steel, can be quickly reached and exceeded when a high concentration of $H_2S$ is reacted. Also, increased temperature (i.e., above about 350° C.) typically causes an unacceptable increase in the rate of reaction of $SO_2$ formation. The $H_2S$ concentration range is usually kept low because of the necessity for supplying excess $O_2$ to overcome deactivation of most direct oxidation catalysts caused by water. As a practical matter, this need for a stoichiometric excess of $O_2$ precludes using $H_2S$ concentrations above about 2 vol. %.

U.S. Pat. No. 5,597,546 (Li et al.) describes a method of selectively oxidizing hydrogen sulfide to elemental sulfur, in which a $H_2S$-containing gas mixture contacts with an oxygen-containing gas at 50-500° C. in the presence of a bismuth-based catalyst. The reaction product mixture contains substantially no sulfur dioxide. The bismuth-based catalyst may further contain molybdenum or vanadium atom. R. H. Hass et al. (*Hydrocarbon Processing May* 1981:104-107) describe the BSR/Selectox™ process for conversion of residual sulfur in Claus tail gas or for pre-Claus treatment of a gas stream. K-T Li et al. (*Ind. Eng. Chem. Res.* 36:1480-1484 (1997)) describe the Super-Claus™ TGT system, which uses vanadium antimonate catalysts to catalyze the selective oxidation of hydrogen sulfide to elemental sulfur. U.S. Pat. No. 6,521,020 (Butwell et al.) and U.S. Pat. No. 5,603,913 (Alkhazov et al.) describe several oxide catalysts that are said to be capable of catalyzing the direct oxidation of $H_2S$ to elemental sulfur. U.S. Pat. No. 6,506,356 (Chung et al.) discusses the problem of deactivation of many tail gas treatment catalysts by the presence of water. Certain vanadium-titanium based mixed metal oxide catalysts are described which are said to be capable of selectively oxidizing $H_2S$ to elemental sulfur at low temperatures in the presence of excess moisture. A method employing such catalysts for recovering elemental sulfur from a reaction gas containing 0.5-40 vol % $H_2S$ and 30-50 vol % moisture is described.

Despite the advancements that have been made in direct oxidation processes for treatment of Claus tail gases, none of the existing methods are capable of providing sufficiently high levels of $H_2S$ conversion and selectivity for production of sulfur in a single-pass reaction from concentrated $H_2S$ streams. No existing direct oxidation process has been used to effectively take the place of the thermal stage of a conventional modified Claus process. Existing $H_2S$ direct oxidation processes do not adequately address the typical reactor temperature limitations nor do they operate at sufficiently high flow rates to be sufficiently useful industrially other than as tail gas treatments. Neither are they able to adequately address other major problems with today's modified Claus processes and plants, including a) hydrocarbon contamination of the feed gas, b) excessive $CO_2$ in the feed gas, c) ammonia in the feed gas, d) insufficient residence time in the burner/reaction chamber, e) excessive pressure drop caused by flow fiction; and f) inability to process $H_2S$ streams containing less than about 20% $H_2S$. Better systems and processes for removing sulfur from $H_2S$ and avoiding the problems discussed above would find widespread applicability in a number of industrial situations.

SUMMARY OF THE INVENTION

The various embodiments of the present invention solve many of the operational drawbacks of existing Claus plants and sulfur recovery processes by replacing the customary Claus burner and reaction furnace with a more efficient short contact time catalytic partial oxidation reactor (SCTR) and $H_2S$ partial oxidation catalyst capable of operating efficiently at higher temperatures than has been previously thought possible or practical. Thus, a simpler, less costly sulfur recovery plant and process are provided. Expansion of Claus plant capacity is made possible using smaller, less complicated equipment. A sulfur recovery process using the disclosed apparatus avoids formation of the problem by-products that are typical of most Claus processes used today. Some of the present or potential advantages offered by the present methods and apparatus include: a) the ability to efficiently process feeds containing as little as about 10% $H_2S$ and up to about 100% $H_2S$; b) elimination of undesirable products of hydrocarbon combustion from the product gas stream; c) by eliminating the Claus furnace, the problem of lowered flame temperature due to excessive carbon dioxide ($CO_2$) in the feed gas is avoided; d) ammonia in the feed gas is decomposed by the SPOC™ catalyst instead of reacting with $SO_2$ in the reaction furnace; e) the problems associated with insufficient residence time in the Claus burner/reaction furnace are avoided; and f) excessive pressure drop caused by flow friction in conventional Claus furnaces is reduced.

By substituting the present apparatus and process for a conventional Claus plant and process, the processing of greater amounts of sour crude oil and sour natural gas in petroleum refineries is made possible. The handling of such large amounts of $H_2S$ would be impossible using conventional Claus plants. By substituting a sulfur removal system of the present invention for a conventional Claus burner, a sulfur recovery plant can be economically modified to handle higher capacities and a wider range of operations than would be possible with a conventional Claus burner.

The present process also provides an improvement over other catalytic direct oxidation methods for converting $H_2S$ directly to sulfur by eliminating the need to limit the operating temperature to less than 500° C., and avoiding the need for a large stoichiometric excess amount of $O_2$—Without wishing to be limited to a particular theory, it is thought that the temperature constraints that are typical of existing (low temperature) direct oxidation processes are avoided in the present SPOC™ process, which is operated at elevated temperature, due to the use of efficient and selective partial oxidation catalysts, high flow rates (short residence time on the hot catalyst), and rapid quenching of the reacted gases (i.e., less than 100 milliseconds), which minimizes the occurrence of undesirable side reactions such as the reverse Claus reaction and recombination of hydrogen and sulfur to make $H_2S$. Thus, a SPOC™ reactor system can provide equivalent or better yield of elemental sulfur than a Claus burner/reactor furnace unit. The new process, and system for carrying out such process, are capable of operating at gas hourly space velocities (GHSV) above 20,000 $h^{-1}$. In some embodiments the GHSV is above 100,000 $h^{-1}$. In some embodiments the preferred GHSV is in the range of 500,000 $h^{-1}$ to 1,000,000 $h^{-1}$. The new process and system is preferably capable of providing high conversion levels of $H_2S$ and high selectivity for elemental sulfur production. These improvements provide a much simpler sulfur processing unit which can be incorporated in line with most petroleum refinery or natural gas plants such as hydrotreaters, cokers, and fluid catalytic crackers. The process of the present invention employs catalysts that are active for catalyzing the direct partial oxidation of $H_2S$ to sulfur and water in a short contact time reactor (SCTR) at elevated temperatures that exceed the useful operating temperatures of known direct oxidation processes. For the purposes of this disclosure the term "elevated temperature," when used in the context of the catalyst, process and SCTR of the present invention, refers to a temperature or range of temperatures above 500° C., preferably in the range of 550-1,500° C., more preferably in the range of 800-1,450° C. In certain embodiments of the present invention, a conventional Claus sulfur recovery plant, which normally has a combustion furnace for combusting hydrogen sulfide to form elemental sulfur and water, is improved by replacing the combustion burner or furnace with a flameless millisecond contact time catalytic reactor, sometimes referred to herein as a SPOC™ reactor.

In accordance with certain embodiments of the present invention, a sulfur recovery system is provided that comprises (a) a catalytic partial oxidation reaction zone containing a first catalyst that is capable of catalyzing the partial oxidation of $H_2S$ to elemental sulfur and water in the presence of $O_2$; (b) a cooling zone capable of receiving reacted gases from said catalytic partial oxidation reaction zone and cooling said reacted gases sufficiently to condense liquid sulfur; and (c) a Claus reaction zone for catalytically converting $H_2S$ and $SO_2$ in said reacted gases to sulfur and water, and having a desulfurized reacted gas outlet. The cooling zone has a liquid sulfur outlet and a reacted gas outlet. In some embodiments the system the Claus reaction zone comprises at least two Claus catalytic reactors, in serial flow arrangement, for receiving and desulfurizing the reacted gases from the short contact time reactor. The Claus reaction zone may comprise a series of reheaters, Claus catalytic converters, and sulfur condensers typical of a conventional Claus plant. The new system may also include one or more tail gas treatment unit (TGTU), similar to those in use today, or an equivalent or improved TGTU.

In some embodiments the cooling zone comprises a heat exchanger for receiving reacted gases from said catalytic partial oxidation reaction zone and capable of cooling the reacted gases to a temperature above the dewpoint of sulfur; and a first sulfur condenser for receiving partially cooled reacted gases from the heat exchanger. The sulfur condenser includes the liquid sulfur outlet and the first desulfurized gas outlet.

The catalytic partial oxidation reaction zone is housed in a reactor capable of withstanding elevated temperatures (i.e., in excess of 500° C.), and is preferably capable of withstanding the temperatures generated by the catalytic partial oxidation reaction, and even up to 1,500° C. In preferred embodiments the heat exchanger comprises a plurality of thermally conductive tubes and includes at least one thermal insulator, such as a refractory ferrule made of a ceramic material, between the catalytic partial oxidation reaction zone and the thermally conductive tubes.

Also provided in accordance with certain other embodiments of the present invention, is a process for recovering sulfur from a $H_2S$-containing gas stream. Preferably the above-described system or apparatus is employed. In some embodiments, the process is simply an improvement of a conventional Claus sulfur recovery process in which, in the first (thermal) stage, a portion of the hydrogen sulfide in the feed is combusted in a combustion furnace to form elemental sulfur and water. The improvement comprises carrying out the catalytic partial oxidation of hydrogen sulfide a short contact time reactor at elevated temperature instead of combusting hydrogen sulfide in a conventional combustion furnace.

In accordance with certain embodiments of the invention, a sulfur recovery process is provided that includes (a) contacting a reactant gas stream comprising a mixture of $H_2S$ and $O_2$ with a first catalyst in a catalytic partial oxidation reaction zone, whereby a first stage product gas stream is formed; (b) maintaining the temperature of the reactant gas stream above the dewpoint of sulfur; (c) maintaining the temperature of the catalytic partial oxidation reaction zone above 500° C.; and, (d) in a cooling zone, cooling the first stage product gas stream sufficiently to condense liquid sulfur and to provide a stream of partially desulfurized first stage product gas comprising $H_2S$ and $SO_2$. In preferred embodiments this process further includes a second stage in which at least one Claus catalytic conversion step is performed in which $H_2S$ and $SO_2$ is converted to elemental sulfur and water, thereby providing a second stage product gas stream comprising elemental sulfur and water. This process further includes condensing elemental sulfur from the second stage product gas stream to provide a tail gas stream.

In some embodiments the second stage of the above-described process comprises carrying out serially three Claus catalytic conversion steps. In some embodiments, an above-described process includes carrying out serially at least one tail gas treatment, whereby residual sulfur-containing compounds are removed from the tail gas stream.

In certain embodiments of the process, the $O_2:H_2S$ molar ratio is in the range of 0.25:1 to 0.75:1 in said reactant gas stream. In certain embodiments a process is provided in which the temperature of the catalytic partial oxidation reaction zone is maintained above 500° C., preferably in the range of 550° C. to 1,500° C., more preferably in the range of 650-1,450° C. or between about 800° C. and about 1,400° C. In some embodiments the temperature of the reaction zone stabilizes in the range of about 700-850° C. In some embodiments the $H_2S$ containing stream is preheated to a temperature of as much as about 300° C., preferably no more than about 200-250° C. before contacting said first catalyst. In some embodiments the contact time of each portion of said reactant gas stream that contacts said first catalyst is no more than about 1 second, preferably 200 milliseconds or less, more preferably less than 50 milliseconds. A contact time of 10 milliseconds or less is highly preferred in some embodiments. In certain embodiments autothermal catalytic partial oxidation reaction promoting conditions are maintained. Certain embodiments of a process according to the present invention operate at a gas hourly space velocity of at least about 20,000 $h^{-1}$, preferably above 100,000 $h^{-1}$. In some embodiments, the GHSV is in the range of 20,000 $h^{-1}$ to 1,000,000 $h^{-1}$, and in certain embodiments is in the range of 100,000 $h^{-1}$ to 500,000 $h^{-1}$. In certain embodiments a sulfur recovery process in accordance with the present invention is operated at superatmospheric pressure. In some embodiments, the pressure is in the range of about 1 to 10 atmospheres.

In certain embodiments the first catalyst that is employed in a process according to the present invention comprises at least one metal chosen from the group consisting of Pt, Rh, Ru, Ir, Ni, Pd, Fe, Co, Re, Rb, V, Bi, Sb, Mg, Ca and Ba, and optionally at least one lanthanide element chosen from the group consisting of La, Ce, Pr, Nd, Pm, Sm, Eu, Gd, Th, Dy, Ho, Er, Tm, Yb and Lu. In certain embodiments the first catalyst comprises at least one metal chosen from the group consisting of Pt, Rh, Ru, Ir, Ni, Pd, Fe, Co, Re, Rb, V, Bi, Sb and Ba, and at least one alkaline earth element chosen from the group consisting of Mg and Ca. In certain preferred embodiments Pt, Rh or a mixture thereof is employed. In certain embodiments the first catalyst includes V, Bi, Sb, Mg, Ca or Ba. In some embodiments the first catalyst contains Sm, Yb or Pr. For example, the first catalyst may contain a samarium oxide coated refractory support. In certain other embodiments, the first catalyst comprises Pt and an oxide Ce or La. In certain other embodiments the first catalyst comprises samarium oxide and rhodium. In some embodiments the first catalyst comprises a platinum-rhodium alloy disposed on a lanthanide oxide coated refractory support. In certain other embodiments the first catalyst comprises one or more carbided metal, e.g., platinum and rhodium. In certain embodiments the first catalyst is in the form of one or more gauze or monolith. In some embodiments the first catalyst is in the form of a plurality of divided units, such as particles, spheres and the like. Preferably the divided units are less than 100 millimeters, preferably less than 25 millimeters in diameter or in their longest dimension. Preferably the divided units are no smaller than 3 millimeters in diameter, or in their longest dimension, although smaller particles might be desired in some instances, depending on the required flow rate and the permissible pressure drop for a particular application.

An advantage provided by certain embodiments of the present invention is that existing processes for removing $H_2S$ from an $H_2S$-containing gaseous stream that customarily employ a Claus sulfur recovery plant with a first stage burner/reactor furnace in which $H_2S$ is combusted and reacted with formed $SO_2$, and at least one second stage catalytic reactor in which $H_2S$ and $SO_2$ are converted to elemental sulfur and water, is that such plants can be improved by substituting a flameless millisecond contact time catalytic reactor for the Claus first stage furnace.

These and other aspects, embodiments, features and advantages of the present invention will become apparent with reference to the following drawings and description.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

As used herein, the term "sulfur partial oxidation catalysis," or SPOC™, refers to an elevated temperature, short-contact time catalytic partial oxidation reaction in which the direct partial oxidation of hydrogen sulfide takes place to form elemental sulfur and water, according to Reaction 6. Thus the term "SPOC™ process" refers to a process or method which utilizes that reaction, a SPOC™ catalyst refers to a catalyst that is active or selective for catalyzing the partial oxidation of $H_2S$ at a high temperature, and the term "SPOC™ reactor" refers to a reactor employed for carrying out such reaction, process or method. Likewise, references herein to a "SPOC™-modified Claus plant" or "SPOC™-modified sulfur recovery plant," refer to a modified Claus sulfur recovery plant that has been altered to utilize the SPOC™ reaction instead of the combustion reaction.

Figure 1:
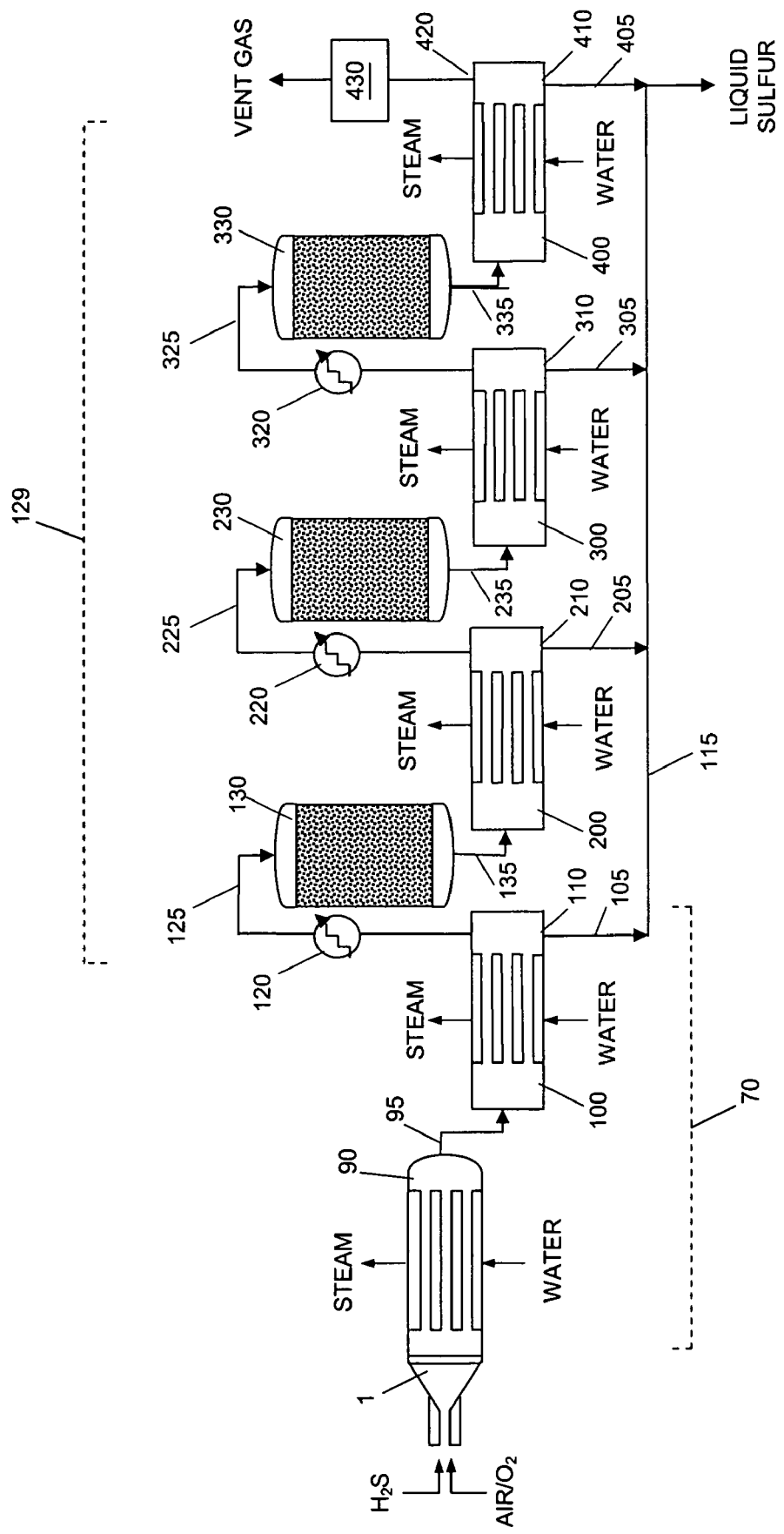
FIG. 1 is a schematic illustration of a modified Claus plant employing a short contact time reactor in accordance with an embodiment of the present invention.

Referring to FIG. 1, a preferred SPOC™-modified sulfur recovery or Claus plant 1 includes a short contact time reactor (SCTR) 10 and a cooling zone 70, which contains a heat exchanger 90 and a first sulfur condenser 100. Following first sulfur condenser 100 is Claus reaction zone 129. Claus reaction zone 129 includes a first heater 120 and a first catalytic (Claus) reactor 130. In continuous flow arrangement after catalytic reactor 130 is a second sulfur condenser 200 having liquid sulfur outlet 210. A second heater 220 follows condenser 200, which in turn connects to a second catalytic (Claus) reactor 230. A third sulfur condenser 300 is next in line after reactor 230 and has a liquid sulfur outlet 310. A third heater 320, which is preferably like heaters 120 and 220, is in line between condenser 310 and a third catalytic (Claus) reactor 330. A fourth sulfur condenser 400 follows reactor 330 and has an outlet 410 for liquid sulfur and an outlet 420 for residual or tail gas. Depending on the purity of the $H_2S$ stream, the particular contaminating gases included in the feedstock, and the applicable purity requirements for the residual gas stream, the system may also include another heater (not shown) and one or more conventional Claus tail gas clean up unit 430 for further processing the residual gas to provide cleaner vent gas from the process. Suitable processes for use in the tail gas cleanup unit 430 for removing residual sulfur-containing components (e.g., $H_2S$, $SO_2$, COS, $CS_2$ and residual $S^o$ vapor) from a sulfur plant product stream are well known in the art.

Although a preferred arrangement of three sequentially arrayed Claus reactor units (each including a heater, Claus catalytic converter and sulfur condenser) are shown in FIG. 1, it should be understood that more or fewer than three such units may be employed in Claus reaction zone 129 if the applicable concentration requirements for the residual gas so indicate (e.g., greater than about 98% free of $H_2S$).

Figure 2:
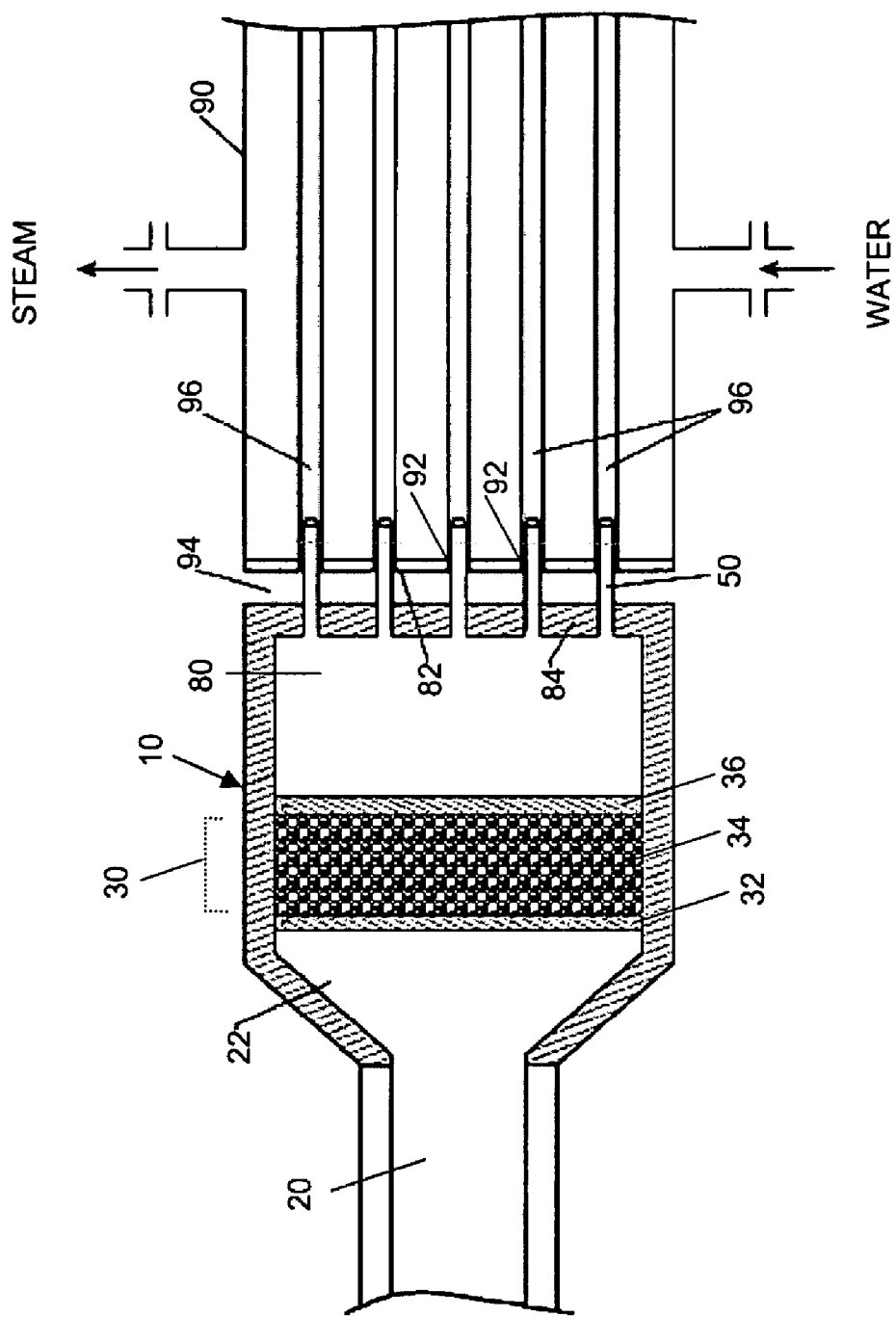
FIG. 2 is an enlarged cross-sectional view of a millisecond contact time reactor employed as shown in FIG. 1.

The reactor 10 is preferably similar to the short contact time (i.e., 200 milliseconds or less)/fast quench (i.e., less than one second) reactors that are used for carrying out the catalytic partial oxidation of light hydrocarbon and hydrogen sulfide mixtures as described in U.S. Pat. No. 6,403,051 (Keller), the disclosure of which is hereby incorporated herein by reference. FIG. 2 illustrates schematically an enlarged cross-sectional view of the reactor 10 of FIG. 1. The reactor is preferably a tube-like structure made of materials capable of withstanding the temperatures generated by the exothermic catalytic partial oxidation reaction (Reaction 6, above). For operating at near ambient pressure, the reactor may be essentially a quartz tube of suitable dimensions. If reactor 10 is to be operated at superatmospheric pressure, it is preferably constructed to withstand not only the high temperatures of the partial oxidation process but also to withstand feed gas pressures up to at least 3 atmospheres. The reactor may be fabricated of carbon steel or other suitable metallurgy with refractory lining to protect the metal from direct contact with the gas at elevated temperature. For example, a conventional reactor used for operating other high-temperature oxidation processes may be employed. Standard process safety systems and engineering methods may be used in fabrication of reactors for operation at greater than ambient pressure.

Reactor 10 includes a feed gas inlet 20, a reaction zone 30, a reacted gas zone 80 and at least one product gas outlet 50 (five product gas outlets 50 are shown in FIG. 2). Reaction zone 30 preferably includes a thermal radiation shield or barrier 32 positioned immediately upstream of a catalyst 34 in a fixed-bed configuration. Radiation barrier 32 is preferably a porous ceramic or refractory material that is suited to withstand the reactor operating temperatures and provide sufficient thermal insulation to the feed gas mixture to prevent gas phase reactions (pre-ignition) before reaching the catalyst 34 in zone 30. Suitable refractory barrier materials (e.g., alpha alumina) are well known in the art. A second barrier 36, which may be the same as barrier 32, is preferably positioned on the downstream side of catalyst 34 to retain the catalyst bed, which may be particulate, as discussed in more detail below. In commercial scale operations the reactor is constructed of or lined with any suitable refractory material that is capable of withstanding the temperatures generated by the exothermic catalytic partial oxidation reaction. Barrier 36 is preferably capable of providing sufficient thermal insulation to the product gas mixture from reaction zone 30 to permit the gases to begin cooling in reacted gas zone 80 as they move rapidly toward the reactor outlet(s) 50. Also shown in FIG. 2 is a portion of heat exchanger 90, as described in more detail below.

The catalyst 34 is positioned in reaction zone 30 in the flow path of the feed gas mixture introduced via inlet 20. Catalyst 34 can have any suitable geometry. For example, it could be in the form of one or more layers of wire gauze, a monolith, or a bed of discrete or divided structures that is held between two porous refractory disks (radiation barriers 32,36). Suitable catalyst compositions are described in more detail below in the subsection entitled "$H_2S$ Partial Oxidation Catalysts."

Referring still to FIG. 2, reactor 10 includes an inlet 20 for the feed gas mixture containing $H_2S$ and $O_2$ and mixing zone 22. A static mixer, such as a group of vanes (not shown) projecting from the walls of a concentric perforated pipe may be employed. It should be understood that the configuration of the reactor and the position of the feed injection openings could be configured in a variety of ways without affecting the principles or operation of the present system. For example, a separate $O_2$ injection opening could be positioned such that the oxygen is mixed with the $H_2S$ during the contacting of the $H_2S$-containing gas stream with the first catalyst. Such a configuration may help reduce the occurrence of unwanted side reactions that might otherwise rapidly occur during or after mixing of $O_2$ with the $H_2S$ but prior to contacting the catalytic surfaces. Adjacent reactor outlet(s) 50 is a heat exchanger 90, which can be a conventional waste heat or fire tube boiler, for cooling the product gas mixture. Heat resistant ferrules 82 are embedded in refractory material 84 that lines at least the reaction zone and adjacent portions of reactor 10 that are exposed to high temperatures (e.g., 1,300° C. or more). Tube sheet 94 is a divider between the product gas zone, the hot product gases and the boiling water where the product gas mixture exits the reactor and enters heat exchanger 90. Tube sheet 94 contains a plurality of thermally conductive tubes 96 (five are shown in FIG. 2) which extend from the process (reacted) gas outlet(s) 50 of reactor 10 and through heat exchanger 90. The tube sheet 94 and tubes 96 are preferably made of carbon steel. Water that is contained by the shell of the heat exchanger surrounds the outside of tubes 96. For most of tube sheet 94, including tubes 96, this protection is afforded by the boiling water. Preferably ferrules 82 are made of a refractory ceramic material and extend into tubes 96 as far as necessary to protect the metal tubing from exposure to excessively high temperatures. Together, reacted gas zone 80, heat exchanger 90, sulfur condenser 100, and their component parts, make up cooling zone 70 (as indicated in FIG. 1).

Process for Recovering Sulfur from an H₂S-Containing Stream

In an exemplary mode of operation the system of apparatus shown in FIG. 1 is set up at a refinery to receive a waste gas stream that contains a level of $H_2S$ which is too great to be safely released into the atmosphere and/or from which it is desirable to recover useful elemental sulfur. For example, the initial $H_2S$-containing stream may contain as little as 10% $H_2S$, or it could contain 10-40% $H_2S$ as found in many natural gas plant amine acid gases, or it may even be an acid gas stream containing up to 100% $H_2S$ (by volume). The $H_2S$-containing gas stream and an $O_2$-containing stream enters reactor 10 at inlet 20 (shown in FIG. 2). Molecular oxygen is provided in the form of air, pure oxygen, or an air/oxygen mixture. The feed gases are be introduced as a mixture or fed separately and mixed upstream from reaction zone 30 in a mixing zone 22 ahead of barrier 32. A static mixer, such as a group of vanes projecting from the walls of a concentric perforated pipe is one suitable option (not shown). The manner of mixing the gases may be varied without altering the principles or operation of the system. If the $H_2S$-containing gas and the $O_2$-containing gas are introduced separately, the feed injection openings can be configured in any of a number of different ways without affecting the principles or operation of the present system. As discussed in more detail below, preferably the molar ratio of $O_2:H_2S$ is about 0.25:1 to 0.75:1, more preferably at or near the stoichiometric ratio of 0.5:1.

Prior to contacting the partial oxidation catalyst in the catalytic partial oxidation reaction zone 30, the reactant gas mixture is shielded by radiation barrier 32 from heat that is generated by the chemical reaction occurring in reaction zone 30. Preferably the temperature of the reactant gas mixture is increased up to about 200° C. to facilitate initiation of the reaction by preheating at least one of the feeds. The gases are thoroughly mixed to keep deep oxidation reactions from taking place excessively or predominating in reaction zone 30 to form an excessive amount of $SO_2$. Advantageously, in the present process it is not necessary to eliminate or minimize the production of $SO_2$. However, it is preferred that the reacted gas mixture from reaction zone 30 comprise an amount of $SO_2$ not exceeding about 25 vol %, more preferably the ratio of $H_2S$ to $SO_2$ in the effluent is in the range of 1.8:1 to 2.2:1, in order to facilitate the efficient operation of the subsequent Claus reaction, as further described in paragraphs that follow. The contact time between the oxygen and $H_2S$ is preferably minimized prior to contact with the catalyst in order to prevent formation of a stagnant explosive mixture in the reactor. Contact time between the $O_2$ and $H_2S$ is minimized by placing inert filler material in any void spaces in the piping upstream of the reaction zone.

The contact time of the feed gas stream with the first catalyst is preferably less than about 200 milliseconds. For example, it may be only 20-50 milliseconds, or even 10 milliseconds or less when operating the system at very high flow rates. When employing a catalyst monolith or packed bed of divided catalyst, the surface area, depth of the catalyst bed, and gas flow rate (space velocity) are preferably managed to ensure the desired short contact time (i.e., 200 milliseconds or less). It is well known that contact time is inversely proportional to the "space velocity," as that term is customarily used in chemical process descriptions, and is typically expressed as volumetric gas hourly space velocity in units of $h^{-1}$. Preferably the partial oxidation of $H_2S$ in the first reaction zone is carried out at gas hourly space velocity (GHSV) of at least 20,000 $h^{-1}$, preferably at least 100,000 $h^{-1}$. The maximum velocity will generally be determined by the specific equipment used; however, the theoretical limit is that velocity at which the reaction would be extinguished. If external means of heating the catalyst is used, this theoretical limit is quite large. For example, a preferred working range is 20,000 $h^{-1}$ to about 1,000,000 $h^{-1}$. Another preferred range is 100,000 $h^{-1}$ to about 500,000 $h^{-1}$.

Increasing the GHSV of the feed gas mixture will usually necessitate increasing the pressure of the feed gases. Operation of the process at high pressures generally leads to higher productivity and the advantage of using smaller vessels. Some of the challenges of operation at elevated pressure include the need for enhanced heat transfer in both heating and cooling, metallurgy issues such as metal dusting and corrosion and increased flammability tendency of the reaction mixture. Such factors as ensuring thorough mixing of the reactant gases, avoidance of dead space, employing a SPOC™ catalyst that has favorable composition and structure, and controlling catalyst temperature, all as described herein, address some of those challenges and provide advantages at elevated pressures.

After the rapidly moving reactant gas mixture passes barrier 32 it flows past catalyst 34 in reaction zone 30 and contacts the catalyst where it becomes instantaneously heated sufficiently to initiate an oxidation reaction, the temperature quickly reaching the range of 550° C.-1,500° C., preferably in the range of 800° C.-1,450° C., as the partial oxidation reaction proceeds. The catalyst bed 34 is heated as a result of the exothermic chemical reaction occurring at its surface and thus perpetuates the stated SPOC™ reaction temperature range. Care is taken to avoid contacting the catalyst with the reactant gases at a temperature at or below the dewpoint of sulfur. Although less preferred, in some cases it may be helpful to heat catalyst 34 with external means at startup of the process, so as to initiate the exothermic oxidation reactions on the catalyst. This initial heating (e.g., to about 300° C.-500° C.) can also be accomplished by briefly spiking the feed gas mixture with a readily oxidizable gas (e.g., a light hydrocarbon) to heat up the catalyst sufficiently to initiate the $H_2S$ partial oxidation reaction. The rapid heating of the reactant gas mixture as a result of contact with the hot catalyst promotes fast reaction rates. Maintaining the preferred <200 millisecond range dwell time of the reactant gas mixture on the catalyst produces a favorable balance between temperature elevation due to the exothermic partial oxidation reaction and the convective removal of heat from the reaction zone 30 by the rapidly moving product gas stream. Thus, sufficient heat is generated to maintain the catalyst temperature above 500° C., preferably in the range of 550-1,500° C., more preferably in the range of 800-1,450° C. Once the reactor is running, the reaction is preferably autothermal (i.e., the exothermic partial oxidation reaction supplies the heat needed to perpetuate the partial oxidation reaction), and the temperature of the reaction zone may stabilize at one temperature or stay in a relatively narrow range within the above-mentioned ranges. For example, under some conditions the temperature of an autothermal process may vary only within the range of about 700-1050° C. The catalyzed reaction goes quickly by the direct partial oxidation of the $H_2S$ to form sulfur and water according to Reaction 6. The most likely value for x in Reaction 6 at the preferred temperatures and pressures of the presently disclosed process is x=2. Small amounts of light hydrocarbon, if present in the $H_2S$ feed, will likely be partially oxidized at the same time to CO and $H_2$ under the $H_2S$ catalytic partial oxidation reaction conditions, if catalyst 34 possesses at least some activity for catalyzing the partial oxidation of hydrocarbons.

Referring to FIGS. 1 and 2, the rapidly flowing gases exit reaction zone 30 through barrier 36 (FIG. 2) and enter cooling zone 70, which includes the reacted gas zone 80 followed by a heat exchanger 90 and then a sulfur condenser 100 (as shown in FIG. 1). The thermal barrier 36 holds the catalyst bed in place and shields the reacted gases from the hot catalyst, and the temperature of the reacted gases emerging from reaction zone 30 starts to decline rapidly. In heat exchanger 90 the product gases from the second stage reaction zone are cooled in the thermally conductive tubes 96 to below 225° C. and preferably to below about 170° C., but not to the dewpoint of sulfur or below. At the same time, the water surrounding tubes 96 is raised to its boiling point by heat conducted away from the hot gas through tubes 96. Optionally, boiling water may be circulated over tubes 96 to reduce the amount of water temperature variation. It is preferable to capture the evolved steam for secondary use. Since the boiling water remains at a relatively constant temperature, and since the metal conducts heat so readily, tubes 96 and most of tube sheet 94 attain temperatures only slightly above the temperature of boiling water. This is not the case for the upstream portions of tube sheet 94 where each of the tubes 96 connect at respective joints 92, however. When tubes made of carbon steel are employed, the joints and the first part of the tubes will see temperatures far exceeding the safe operating limits for the metal. The refractory covering 84 and a heat resistant ferrule 82 provide insulation for these vulnerable areas of metal. Thus, only metal surfaces that are adequately exposed to the circulating water will directly encounter the hot process gases, which can reach 1,300° C. or more. Ferrules 82 connect to tubes 96 and, together with tube sheet 94, force the product gas mixture to exit the reactor by going into tubes 96, and heat exchanger 90 includes an outlet for steam. The rapid cooling that occurs in the heat exchanger 90 drops the temperature of the reacted gases to below about 225° C. and thus ceases the chemical reactions. From heat exchanger 90, the water vapor, gaseous elemental sulfur, $SO_2$, unreacted $H_2S$, and any incidental gases or combustion products, exit heat exchanger 90 through reacted gas outlet 95 and flow into sulfur condenser 100, where they are cooled further until the dew point of elemental sulfur is reached. The liquid sulfur that forms in sulfur condenser 90 exits by way of outlet 110 and line 105. At this point, preferably at least 60% of the $H_2S$ in the feed gas stream will have been converted to elemental sulfur. Thus the reacted gas stream (i.e., the feed to the second (Claus reaction) stage contains primarily $SO_2$, $H_2$, $H_2O$ and unconverted $H_2S$. Depending on the composition of the feedstocks, other incidental components of the gas mixture emerging from the first (SPOC™ process) stage can include COS, $CS_2$, $N_2$, $CO_2$ and CO.

From condenser 100, the reacted gas stream enter Claus reaction zone 129. Referring still to FIG. 1, the reacted gas stream passes through a heater 120 where the gases are reheated to a temperature of about 400-500° F. (about 204-260° C.), and then the reacted gas stream enters first Claus reactor 130, via line 125. Reactor 130 contains a catalyst that is capable of catalyzing the Claus reaction (Reaction 2) to convert a portion of the $H_2S$ and $SO_2$ to elemental sulfur and water. From Claus reactor 130, through line 135, the reacted gas stream then enters a second sulfur condenser 200, where more sulfur is condensed and removed via outlet 210 and line 205. The additional liquid sulfur may be combined with the flow of liquid sulfur from line 105 by way of line 415. The reacted gas stream, having been further desulfurized, then enters another Claus reactor unit, which is preferably like the previous one. The second Claus reactor unit includes heater 220, Claus reactor 230 and sulfur condenser 300. Once again, the liquid sulfur exiting outlet 310 by line 305 may be combined in line 415 with the flow of liquid sulfur from lines 105 and 205. Employing an exemplary sulfur recovery plant configured as schematically depicted in FIG. 1, the reacted gas stream emerging from condenser 300 is once again treated in a Claus catalytic reactor unit. The third Claus reactor unit includes heater 320, Claus reactor 330 and sulfur condenser 400. The additional portion of liquid sulfur exiting outlet 410 by line 405 may be combined in line 415 with the flow of liquid sulfur from lines 105, 205 and 305, all of which can be recovered as usable elemental sulfur. In some situations, however, such as where the $H_2S$-containing feedstock contains an appreciable amount of contaminating gases, it may be desirable to remove even very low levels of sulfurous or other components before the residual gases are vented into the atmosphere. In such case, the gas leaving sulfur condenser 400 may be reheated and sent to a conventional Claus tail gas treatment unit 430, or a series of tail gas treatment units, as necessary for the particular application. Suitable tail gas treatment units are well known in the art (e.g., basic aqueous solutions and hydrogenation/amine absorption systems).

$H_2S$ Partial Oxidation Catalysts

Referring again to FIG. 2, for simplicity the catalyst 34 of reaction zone 30 is depicted as a particle bed. It could also be one or more wire mesh or gauze layer, a monolith or a particle bed containing any of a variety of geometries. The catalyst is preferably configured so that only a first fraction of the feed gas mixture contacts the catalytically active surfaces while the balance of the reactant gas mixture serves to quickly cool the first fraction and prevent the oxidation reaction from proceeding too far in the first reaction zone. The catalyst may be formed entirely of catalytic material, or it may comprise one or more catalytic components supported on a non-catalytic refractory support. When the catalyst is in the form of a gauze, it is preferably one or more layers of a substantially planar, flexible woven metal-containing or metal-coated screen or gauze having about 20-120 mesh. More preferably, it is a single gauze of metal wires, or a short stack of gauzes, of diameter compatible with the diameter of the reactor. In a laboratory scale reactor about 25 cm in length, the catalysts are preferably about 25 micrometers (μm) to about 2.5 millimeters (mm) in diameter and each metal gauze layer may be about 0.28 mm thick. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

Metal Gauzes. One type of catalyst is in the form of one or more layers of substantially planar, flexible woven metal-containing or metal-coated screen or gauze having about 20-120 mesh and diameter compatible with the inner diameter of the reactor. Suitable metals that may be formed into a gauze or deposited onto a non-catalytic gauze support include platinum, rhodium, ruthenium, iridium, nickel, palladium, iron, cobalt, rhenium and rubidium, or a mixture of any of those metals. Some of the more preferred gauze-type catalysts are made of about 87-93% by weight (wt %) Pt and about 7-13 wt % Rh (wt % based on total weight of the catalyst device). Alternative catalyst structures or devices may be in the form of one or more perforated disks, honeycomb-like structures, etched foils or any other suitably active structure that provides the desired gas flow rate to effect the desired partial oxidation.

Rh on a Ln-modified Refractory Support. Another type of catalyst that is active for catalyzing the direct partial oxidation of $H_2S$ to elemental sulfur comprises about 0.005 to 25 wt % Rh, preferably 0.05 to 25 wt % Rh, and about 0.005 to 25 wt % of a lanthanide (Ln) element (i.e., La, Ce, Pr, Nd, Pm, Sm, Eu, Gd, Tb, Dy, Ho, Er, Tm, Yb and Lu), preferably samarium, ytterbium or praseodymium, in the form of the metal and/or metal oxide coating a refractory monolith or a plurality of distinct or discrete structures or particulates. The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst device, system or particle bed has sufficient porosity, or sufficiently low resistance to gas flow, to permit a stream of said reactant gas mixture to pass over the catalyst at a gas hourly space velocity (GHSV) of at least about 20,000 $h^{-1}$, preferably at least 100,000 $h^{-1}$, when the reactor is operated to produce elemental sulfur and water from a hydrogen sulfide stream.

Preferably the catalyst support materials are pre-shaped as granules, spheres, pellets, or other geometry that provides satisfactory engineering performance, before application of the catalytic materials. A preferred form of this Rh-Ln catalyst is granules or spheres having a size in the range of about 50 microns to 6 mm in diameter (i.e., about 120 mesh, or even smaller, to about ¼ inch). In some instances the particles are no more than 3 mm in their longest characteristic dimension, or range from about 80 mesh (0.18 millimeters) to about ⅛ inch, preferably about 35-50 mesh.

One suitable Rh-Ln catalyst contains about 0.5-10 wt % Rh and about 0.5-10 wt % Sm on a refractory support, especially where the ratio of rhodium to Sm is in the range of about 0.5-2. For example, an active $H_2S$ partial oxidation catalyst is prepared by depositing Rh (e.g., 2-6 wt. %) onto a layer of Sm (e.g., 3-6 wt. %) that coats an alpha-alumina monolith, which contains about 45-80 pores per linear inch. Weight percentages (wt %) refer to the amount of metal component relative to the total weight of the catalyst, including the support, if any.

Rh on an Alkaline Earth-modified Refractory Support. Still another type of catalyst that is active for catalyzing the direct partial oxidation of $H_2S$ to elemental sulfur comprises about 0.005 to 25 wt % Rh, preferably 0.05 to 25 wt % Rh, and about 0.005 to 25 wt % of an alkaline earth element, preferably magnesium or calcium, in the form of the metal and/or metal oxide coating a refractory monolith or a plurality of distinct or discrete structures or particulates, as described above with respect to the Rh-Lanthanide catalysts.

Pt—Rh Alloy on Ln-modified Refractory Support. While many of the above-described catalyst compositions have demonstrated good activity for catalyzing the partial oxidation of $H_2S$, and are satisfactory for a number of SPOC™ applications, it was observed that some metals, such as Rh, suffer from deactivation with extended on stream use due to the formation of sulfur deposits and/or metal sulfide formation that removes the active catalytic form. The surprising discovery was made that this problem is greatly improved or solved completely by combining platinum with rhodium in the catalyst. An especially good catalyst that is highly stable and active for catalyzing the direct partial oxidation of high concentrations of $H_2S$ in a gas stream to elemental sulfur and water contains both platinum and rhodium supported on a samarium-modified refractory support such as the above-described supports and materials. A highly preferred catalyst is prepared by depositing about 0.1%-6 wt % Pt onto about 0.5-6 wt % Rh, which was previously deposited onto an approximately 1-5 wt % lanthanide oxide, preferably samarium oxide, coated refractory support (wt % based on total weight of the supported catalyst). A preferred support is alumina granules, more preferably alpha-alumina. In the present investigations, the surprising synergy between the Pt and Rh components enhanced catalyst stability under $H_2S$ catalytic partial oxidation reaction conditions, and when further combined with a lanthanide or lanthanide oxide promoter provides an even better catalyst for converting hydrocarbon-containing $H_2S$ streams. Catalyst stability refers to resistance to (a) deactivation due to carbon or sulfur deposition, (b) chemical reaction between sulfur and the catalytic components and (c) volatilization of precious metal at reaction conditions. The stability is typically shown by a consistent and reproducible catalytic performance (e.g., $S^0$ yield with $H_2S$ feed).

The above-described Pt—Rh based catalysts are preferably in the form of either a wire gauze, a foam monolith, or in the form of a catalytically active material dispersed or deposited on a refractory support containing zirconia, alumina, cordierite, titania, mullite, zirconia-stabilized alumina, MgO stabilized zirconia, MgO stabilized alumina, niobia or a mixture of any of those materials, or another suitable refractory material. A more preferred catalyst geometry comprises granules prepared by impregnating or washcoating the catalytic components, or their precursors, onto lanthanide coated refractory granules, calcining and reducing the catalyst, using techniques that are well known in the art. A catalyst bed for the $H_2S$ catalytic partial oxidation process may comprise a quantity of such impregnated or coated granules, or other forms of support such as beads, pills, pellets, cylinders, trilobes, extrudates, spheres, other rounded shapes or other manufactured configurations, or irregularly shaped particles, as discussed above with respect to the Rh-Ln catalysts. The supports preferably comprise a refractory material such as zirconia, alumina, cordierite, titania, mullite, zirconia-stabilized alumina, MgO stabilized zirconia, MgO stabilized alumina, niobia or a mixture of any of those materials, or another suitable refractory material. Alumina is preferably in the form of alpha-alumina, however the other forms of alumina have also demonstrated satisfactory performance. The Pt—Rh/Ln catalyst also has superior activity for converting an $H_2S$ stream containing a light hydrocarbon, such as methane, to elemental sulfur and synthesis gas, by way of concurrent hydrocarbon catalytic partial oxidation (CPOX) and SPOC™ reactions carried out over the same catalyst in a single reaction zone, operating the reactor at hydrocarbon, $H_2S$ and $O_2$ concentrations and process conditions that favor the formation of sulfur, water, CO and $H_2$, as described in co-owned U.S. U.S. Pat. No. 6,579,510, which is hereby incorporated herein by reference.

Carbided Pt/Rh on a Refractory Support. Another unexpected discovery was that the gradual deactivation of rhodium, and others among the above-named SPOC™ catalysts, was also improved by carbiding the catalyst under gaseous hydrocarbon flow before, after or during the $H_2S$ flow, under CPOX-promoting reaction conditions. An especially active catalyst that provides improved performance for converting $H_2S$ to sulfur by direct partial oxidation (the $H_2S$ partial oxidation process) is prepared by carbiding a Pt—Rh catalyst before exposing the catalyst to $H_2S$.

A preferred carbiding process includes exposing the catalyst, in any of the forms described above, to light hydrocarbon (a $C_1$-$C_5$ hydrocarbon, preferably methane, ethane, propane or butane) under CPOX reaction conditions as described in U.S. Pat. No. 6,488,907 (Conoco, Inc.), the disclosure of which is hereby incorporated herein by reference. Preferably this hydrocarbon pre-treatment procedure (referred to herein as "carbiding") is carried out with the catalyst in place in the short contact time reactor. The carbiding treatment includes heating the catalyst to at least 700° C. or up to about 1,500° C., preferably in the range of 850° C.-1,450° C., in the presence of the light hydrocarbon. Upon getting the catalyst up to catalytic partial oxidation operating temperature, the flow of hydrocarbon is stopped and the flow of $H_2S$ containing gas is begun for sulfur removal and recovery under SPOC™ operating conditions. It is preferable to perform the carbiding treatment before exposing the catalyst to $H_2S$ or other sulfur compound while the catalyst is at a temperature at which it can chemically react with sulfur or at which sulfur can condense on its active sites. In the carbiding treatment, it is preferable to mix the hydrocarbon with a small amount of oxygen or $O_2$-containing gas to deter or minimize coking of the catalyst during treatment. The amount of oxygen preferably does not exceed the stoichiometric amount necessary to support catalytic partial oxidation of the hydrocarbon (CPOX reaction), i.e., a carbon:oxygen molar ratio of 2:1. If the catalytic components are also active for catalyzing the CPOX reaction, production of synthesis gas (CO and $H_2$) may commence during the pre-treatment step upon reaching a temperature sufficient to initiate the reaction. Without wishing to be bound by any particular theory, it is believed that, in the case of a Pt—Rh alloy catalyst, the formation of Rh and/or Pt carbide in which at least a substantial portion of the catalytic metal component exists in the same phase with carbon (e.g., $RhC_x$ or $PtC_x$), which resists the formation of metal sulfide(s) that can deactivate the catalyst by covering the active centers. Thus, the stability and life of the catalyst on $H_2S$ stream is increased or enhanced by the carbiding treatment. Alternatively, a satisfactory carbided catalyst may be prepared as described in U.S. Pat. No. 6,461,539 (Conoco, Inc.), the disclosure of which is hereby incorporated herein by reference.

EXAMPLES

By implementing the above-described sulfur recovery process and thereby reducing the amount of equipment necessary to obtain a high level of sulfur recovery from an $H_2S$ containing feed gas, the total pressure drop through the sulfur plant can be greatly reduced. Control of $H_2S$, oxygen and reductant gas feeds is maintained using standard sulfur plant equipment, such as air demand analyzers, feed back control and the like. Since Claus plants are normally limited by the amount of pressure drop due to the low pressure operation, the present system advantageously allows for capacity expansion by retrofit of existing Claus plants. Other improvements over existing technologies for sulfur removal are obtainable using the above-described Claus plant configuration and process, as demonstrated in the following representative examples.

Example 1

SPOC™ Resolves the Problem of Hydrocarbon Contamination of the $H_2S$ Feed

The typical problems caused by hydrocarbon contamination of the $H_2S$ feed are greatly improved or entirely avoided by the present process. The standard Claus burner/combustion stage is improved upon by only partially oxidizing the hydrocarbon components of the $H_2S$ feed instead of fully combusting them. Full or complete combustion can be described by the reaction $$C_mH_n + (m+n/4)O_2 \rightarrow mCO_2 + n/2 H_2O \quad (7)$$

whereas partial oxidation of a hydrocarbon can be described by the reaction $$C_mH_n + (a+b/2+d/2)O_2 . aCO_2 + bCO + cH_2 + dH_2O + (m-a-b)C_mH_n \quad (8)$$

For partial oxidation, $(a+b/2+d/2)<(m+n/4)$.

The effect of including methane in the $H_2S$ feed was determined as follows: The laboratory scale SPOC™ reactions were carried out in a modified conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The catalyst bed contained 3 grams by weight of catalyst (volume about 0.1963 in³), and was approximately 12 mm in diameter×4 cm in length (about 0.5 in.×1.5 in.), including the radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

The runs were conducted at a volumetric air to $H_2S$ ratio of 2.4-2.5, and at the $H_2S$ and methane flow rate indicated in Table 1. Preheat temperature of 450° F. (about 232° C.) at 5 psig operating pressure using 3 grams of catalyst. The reactor effluent was analyzed using a gas chromatograph equipped with a thermal conductivity detector. The data reported in Table 1 were obtained after approximately 1 hour on stream at the specified conditions.

The test data reported in Table 1 shows the products obtained when partial oxidation of the hydrocarbons is achieved along with partial oxidation of $H_2S$ versus the total combustion of hydrocarbon components by the Claus process. It can be readily seen that less oxygen was needed to convert the hydrocarbon components using the short contact time reactor modified Claus plant. This feature potentially allows for greater throughput in a sulfur recovery plant when hydrocarbon contaminated the feed, and it makes the Claus unit less susceptible to a hydrocarbon driven emissions upset.

TABLE 1

Reduction of Air Consumption for Hydrocarbons in Claus Plant Feed

| Catalyst composition | Air/$H_2S$ volume ratio | $H_2S$ Flow (sccm) | $CH_4$ Flow (sccm) | % $H_2S$ Converted to S | % Carbon in $CH_4$ Converted to CO | % Carbon in $CH_4$ Converted to $CO_2$ |
|---|---|---|---|---|---|---|
| 4% Rh, 0.5% Pt, 0.5% Sm on alpha-$Al_2O_3$ 1/16" D × 1/4" L extrudates | 2.4 | 1560 | 0 | 74.2 | 0 | 0 |
| | | | 25 | 71.0 | 0 | 58.1 |
| | | | 35 | 70.6 | 0 | 59.4 |
| | | | 77 | 68.5 | 27.7 | 52.6 |
| | | | 117 | 66.2 | 26.6 | 47.0 |
| | | | 156 | 64.8 | 23.4 | 39.1 |
| 4% Pt, 1% Rh, 0.5% Ce on alpha-$Al_2O_3$ 30-mesh granules | 2.5 | 1260 | 0 | 73.6 | 0 | 0 |
| | | | 26 | 72.9 | 23.4 | 61.1 |
| | | | 50 | 72.1 | 24.7 | 58.1 |
| | | | 101 | 69.7 | 25.7 | 51.2 | sccm = standard cubic centimeters per minute

The representative catalyst compositions employed in the tests were prepared by sequential impregnation of the support with the lanthanide oxide or alkaline oxide component followed by calcination and sequential impregnation with rhodium and platinum, in the order given, with calcining between applications to provide highly dispersed rhodium-platinum alloy deposited on the lanthanide oxide modified support. A suitable method of making the catalysts is described in U.S. patent application Ser. No. 09/946,305, the disclosure of which is hereby incorporated herein by reference. It was observed that the active metal components of the catalyst prevented carbon formation during the partial oxidation tests. This provides the potential advantage of solving the problem of soot formation and deposition downstream of the waste heat exchanger. The test data presented in Table 2 shows the effect of varying amounts of hydrocarbon to the short contact time reactor feed. No $CS_2$ was formed and about 1% of the incoming sulfur was converted to COS. Also shown in Table 2 is data from a laboratory Claus reaction burner/furnace plant that measured the effect of fuel gas addition on COS and $CS_2$ formation.

As the data shows, the amount of COS formation was reduced by about 75% in the low hydrocarbon case and by 57% in the high hydrocarbon case. $CS_2$ formation was essentially eliminated.

TABLE 2

Reduction in Production of By-product COS and $CS_2$

| Acid Gas (Mole % in Feed) $H_2S$ | Acid Gas (Mole % in Feed) $CH_4$ | % Inlet $H_2S$ Converted to COS | % Inlet $H_2S$ Converted to $CS_2$ |
|---|---|---|---|
| $H_2S$ Partial Oxidation (SPOC ™) Reactor | | | |
| 88.3 | 11.7 | 2.08 | 0 |
| 93.9 | 6.13 | 0.60 | 0 |
| Claus Laboratory Reactor[1] | | | |
| 88 | 12 | 3.5 | 0.2 |
| 94 | 6 | 2.5 | 0.8 |

[1]From FIG. 4 of "Evaluation of Reaction Furnace Variables," Sames et al., Proceedings of the Laurence Reid Gas Conditioning Conference, Norman, Oklahoma, March 1987

Example 2

SPOC™ Resolves the Problem of Excessive $CO_2$ in the $H_2S$ Feed

The test procedure described in Example 1 was employed, except methane was omitted from the $H_2S$ feed and $CO_2$ was included in the amounts indicated in Table 3. The test data in Table 3 shows the conversions attained using the present invention with varying levels of $CO_2$ in the feed, normally classified as "lean" feeds for a Claus plant. These reaction yields were attained with stable reaction conditions that did not include fuel gas addition or equipment to split the flow of $H_2S$, in contrast to typical Claus processes in which excessive $CO_2$ is present in the feed.

TABLE 3

Straight-through Conversion of Low Levels of $H_2S$ to Sulfur

| % $H_2S$ Flow | % $CO_2$ in Feed | % Sulfur Yield |
|---|---|---|
| 33.75 | 66.25 | 67.0 |
| 28.96 | 71.04 | 66.2 |
| 25.36 | 74.64 | 66.6 |
| 22.55 | 77.45 | 66.7 |

Example 3

SPOC™ Process Destroys Ammonia in the Feed

The same test procedure described in Example 1 was employed, except methane was omitted from the $H_2S$ feed and $NH_3$ was included in the amount indicated in Table 4. The catalyst was composed of 2% Pt-1% Rh/2% Mg on magnesium oxide granules, and formed a 3/4" L×1/2" D bed. The test results in Table 4 show the $NH_3$ destruction performance under the indicated conditions. It can also be appreciated that the SPOC™-modified Claus process provides an advantage over conventional Claus processes in reduced residence time.

TABLE 4

| Inlet NH₃ concentration (%) | Residence Time (msec) | NH₃ conversion (%) | Air (SLPM) | H₂S (SLPM) | NH₃ (SLPM) | Air/ (H₂S + NH₃) | H₂S/NH₃ |
|---|---|---|---|---|---|---|---|
| 14.107 | 38.4 | 83.32 | 2.652 | 0.962 | 0.158 | 2.37 | 6.1 |
| 14.107 | 37.3 | 87.69 | 2.763 | 0.962 | 0.158 | 2.47 | 6.1 |
| 14.120 | 36.3 | 93.92 | 2.873 | 0.961 | 0.158 | 2.57 | 6.1 |
| 14.120 | 35.3 | 97.63 | 2.986 | 0.961 | 0.158 | 2.67 | 6.1 |
| 14.120 | 34.4 | 97.97 | 3.095 | 0.961 | 0.158 | 2.77 | 6.1 |
| 14.107 | 33.5 | 98.69 | 3.206 | 0.962 | 0.158 | 2.86 | 6.1 |
| 14.120 | 32.6 | 98.82 | 3.319 | 0.961 | 0.158 | 2.97 | 6.1 |

As demonstrated above, a preferred SPOC™ catalyst contains Pt. At the operating temperature in the short contact time reactor, Pt will catalyze the dissociation of ammonia via the reastion $$2NH_3 \rightarrow N_2 + 3H_2 \qquad (9)$$

Since this does not require oxygen for the initial $SO_2$ formation, and since the entire reaction mixture comes to a uniform composition at maximum temperature more rapidly than in a Claus burner, oxidation of the hydrogen formed in the dissociation can take place without the $SO_2$ intermediate reducing the amount of time needed to destroy the ammonia completely. A modified Claus plant that substitutes a short contact time reactor for the Claus furnace will be able to handle ammonia more efficiently than existing Claus plants, especially if increased sulfur plant feed volumes are anticipated.

Example 4

SPOC™ Reactor Avoids Claus Burner Residence Time Limitation

The Claus process is an equilibrium limited process in which, theoretically, infinite times are needed to reach Claus equilibrium. In practice, residence times of about 1 to 1.5 sec are needed to approach close to equilibrium conversion in a conventional Claus burner/reaction furnace. Experimental data and data obtained from an operating Claus plant are shown in Table 5, which compares the sulfur yield trend in each system. Actual flow rate effects were not obtained. These data indicate that by doubling the feed rate to the SPOC™ reactor as described in Example 1, yields actually increased, but the same operation in the Claus reactor significantly retarded the process in achieving equilibrium conversion. In conventional Claus units that suffer from hydrocarbon contamination (COS and $CS_2$ formation), the drop in yield in the reaction furnace can hamper hydrolysis of COS and $CS_2$ in downstream catalyst beds that will increase emissions in units without tail gas treating.

TABLE 5

Loss of Conversion Due to Decrease in Reactor Residence Time

| Air Flow (moles/day) | Acid Gas Flow (moles/day) | % Sulfur Yield in Reactor |
|---|---|---|
| H₂S Partial Oxidation (SPOC ™) Reactor | | |
| 118 | 49 | 71.96 |
| 194 | 81 | 73.65 |
| 241 | 101 | 73.28 |

TABLE 5-continued

Loss of Conversion Due to Decrease in Reactor Residence Time

| Air Flow (moles/day) | Acid Gas Flow (moles/day) | % Sulfur Yield in Reactor |
|---|---|---|
| Claus Unit Operation | | |
| 11791 | 4773 | 61.0 |
| 13266 | 4723 | 56.0 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optionally" with respect to any element of a claim is intended to mean that the subject element is required, or alternatively, is not required. Both alternatives are intended to be within the scope of the claim. The disclosures of all patents, patent applications and publications cited herein are hereby incorporated herein by reference, to the extent that they provide exemplary, procedural or other details supplementary to those set forth herein.

What is claimed is:

1. A process for recovering sulfur from a H₂S-containing gas stream comprising:
   directing a reactant gas stream comprising a mixture of H₂S and O₂ into a catalytic partial oxidation reaction zone with a partial oxidation catalyst under catalytic partial oxidation conditions and catalyzing the reactant gas stream to produce a first stage product gas stream;
   maintaining the temperature of said catalytic partial oxidation reaction zone above 500° C.;
   condensing gaseous elemental sulfur from said first stage product gas stream to provide liquid sulfur and a partially desulfurized first stage product gas stream comprising H₂S and SO₂;
   separating at least a portion of the liquid sulfur from the first stage product gas stream;
   directing the first stage product gas stream into a Claus reaction unit with Claus catalyst under Claus catalytic conditions and converting H₂S and SO₂ to elemental sulfur and water to yield a second stage product gas stream comprising elemental sulfur and water; and condensing elemental sulfur from said second stage product gas stream to provide a tail gas stream.

2. The process of claim 1 further comprising carrying out serially at least one tail gas treatment whereby residual sulfur-containing compounds are removed from said tail gas stream.

3. The process of claim 1 comprising maintaining a $O_2:H_2S$ molar ratio in the range of 0.25:1 to 0.75:1 in said reactant gas stream.

4. The process of claim 1 further comprises maintaining the temperature of said catalytic partial oxidation reaction zone in the range of 500° C.-1,500° C.

5. The process of claim 1 wherein said contacting said reactant gas stream comprises providing an $H_2S$ containing stream and an $O_2$ containing stream and preheating said $H_2S$ containing stream to about 200° C. before contacting the partial oxidation catalyst.

6. The process of claim 1 wherein said contacting said reactant gas stream comprises contacting each portion of said reactant gas stream that contacts the partial oxidation catalyst for a contact time of no more than about 1 second.

7. The process of claim 6 wherein said contacting said reactant gas stream comprises contacting each portion of said reactant gas stream that contacts the partial oxidation catalyst for a contact time of no more than about 10 to 200 milliseconds.

8. The process of claim 1 comprising operating said process at a space velocity of at least about 20,000 $h^{-1}$.

9. The process of claim 1 comprising operating said process at superatmospheric pressure.

10. The process of claim 1 wherein the partial oxidation catalyst comprises at least one metal chosen from the group consisting of Pt, Rh, Ru, Ir, Ni, Pd, Fe, Co, Re, Rb, V, Bi, Sb, Mg, Ca and Ba, and optionally, at least one lanthanide element chosen from the group consisting of La, Ce, Pr, Nd, Pm, Sm, Eu, Gd, Tb, Dy, Ho, Er, Tm, Yb and Lu.

11. The process of claim 1 wherein the partial oxidation catalyst comprises at least one metal chosen from the group consisting of Pt, Rh, Ru, Ir, Ni, Pd, Fe, Co, Re, Rb, V, Bi, Sb and Ba, and optionally at least one alkaline element chosen from the group consisting of Mg and Ca.

* * * * *